United States Patent [19]

Yeh

[11] 4,403,182
[45] Sep. 6, 1983

[54] DRY-CELL HOLDERS

[75] Inventor: Warner S. Yeh, Kowloon, Hong Kong

[73] Assignee: Sonca Industries Limited, Hong Kong, Hong Kong

[21] Appl. No.: 313,999

[22] Filed: Oct. 21, 1981

[30] Foreign Application Priority Data

Nov. 6, 1980 [GB] United Kingdom ................. 8035650

[51] Int. Cl.³ ........................................... H01M 10/46
[52] U.S. Cl. ....................................................... 320/2
[58] Field of Search ........................................ 320/2–4, 320/15; 339/32, 185 R; 429/9, 96, 99, 100

[56] References Cited

U.S. PATENT DOCUMENTS

| | | | |
|---|---|---|---|
| 2,780,766 | 2/1957 | Hedding et al. | 320/4 |
| 4,101,818 | 7/1978 | Kelly et al. | 320/3 X |
| 4,303,876 | 12/1981 | Kelly et al. | 320/3 X |

Primary Examiner—William M. Shoop
Attorney, Agent, or Firm—Wenderoth, Lind & Ponack

[57] ABSTRACT

A holder for dry-cells, for example for use in an electrical re-charging unit for dry-cells, has locating means for a dry-cell or a line of dry-cells disposed end-to-end in electrical series, and electrical contacts for the base and central electrode of the dry-cell or, where there is a line of dry-cells, of the two endmost dry-cells respectively, the first contact being radially offset so as not to make contact with the central electrode of a dry-cell which is placed the wrong way round in the locating means. In a preferred arrangement the locating means is in the form of a channel with steps in its sidewalls so as to provide pairs of shoulders which will support different diameters of dry-cells at different levels; in this arrangement the offset first contacts for all the sizes of cell are rigidly interconnected and the second contacts for all the sizes of cells are rigidly interconnected.

8 Claims, 10 Drawing Figures

DRY-CELL HOLDERS

This invention relates to dry-cell battery, hereinafter simply dry cell holders and has a particularly useful but not exclusive application in any form of apparatus which incorporates one or more dry-cells in conjunction with electronic controls, and in which there is a risk of damage to the apparatus if the cell or cells are disposed the wrong way about. One example of such apparatus is a re-charging unit for re-charging dry-cells.

According to this invention there is provided a dry-cell holder comprising means for locating a dry-cell or a line of coaxially disposed dry-cells and first and second contact elements for respectively engaging the base and central electrode of the dry-cell or, where there is a plurality of coaxially disposed dry-cells, the base of one end dry-cell and the central electrode of the other end dry-cell, the first contact element being offset radially with respect to the second contact element and the central axis of a dry-cell or line of dry-cells supported in the locating means, such that the first contact element fails to make contact with the central electrode of an adjoining dry-cell placed the wrong way about in the locating means.

According to a preferred feature of the invention, the locating means is adapted to locate dry-cells of differing diameters at different levels, contact means being provided which provides a rigidly interconnected set of first contact elements for respectively engaging the bases of dry-cells at said levels and a rigidly interconnected set of said second contact elements for respectively engaging the central electrodes of dry-cells at said levels, each of said first contact elements being offset outwardly with respect to the associated second contact element such that the first contact elements fail to make contact with the central electrodes of dry-cells placed the wrong way about in the locating means.

One embodiment of the invention will now be described by way of example with reference to the accompanying drawings in which:

FIGS. 2b and 2c are fragmentary views illustrating a dry-cell supported in correct and incorrect positions respectively in the locating means of FIG. 1a.

Figure 1:
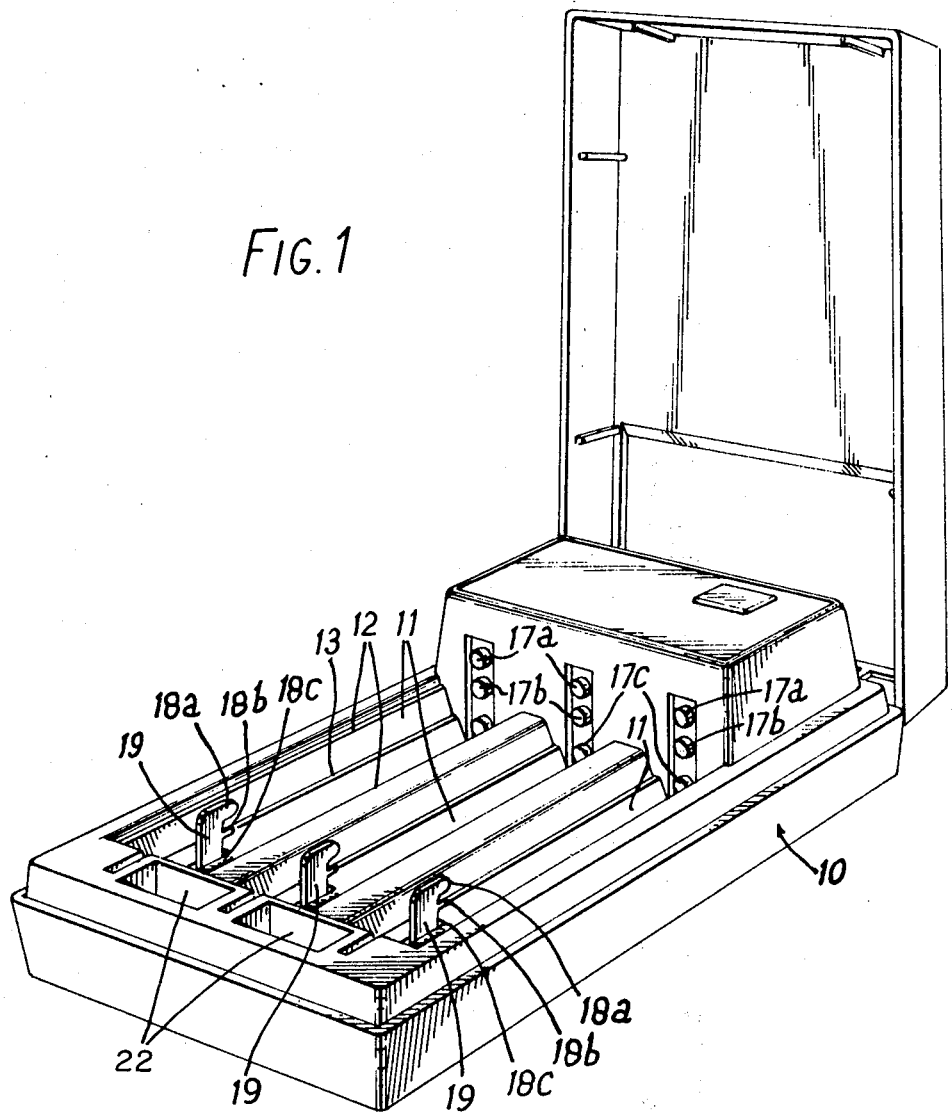
FIG. 1 shows a perspective view of a dry-cell re-charging unit embodying a holder according to the invention.

Referring first to FIG. 1 of the drawings, a re-charging unit for re-chargeable dry-cells is shown. The base 10 of the unit provides three parallel channels 11 of each of which is capable of receiving a dry-cell having any of three diameters. For this purpose each channel has a cross-section as shown in FIG. 2a with edges or shoulders 12 for supporting the largest diameter dry-cell accommodated, shoulders 13 for supporting the intermediate size of dry-cell (as shown in FIG. 3a), and the bottom 14 and adjacent parts 15 of the sides of the channel supporting the smallest diameter of single-cell dry-cell accommodated, as shown in FIG. 4a.

A dry-cell disposed in any one of the three positions has its central electrode engaged by an associated one of three fixed contact elements 17a, 17b, 17c. The base of the dry-cell is engaged by an associated one of three contact elements 18a, 18b, 18c constituted by projections on a metal plate member 19 which has a foot portion 20 disposed underneath the base of the channel. The foot portion 20 is urged towards the contact elements 17 by a spring 21 which serves also to connect the contact elements 18 in circuit with the associated contact elements 17.

Figure 2B:
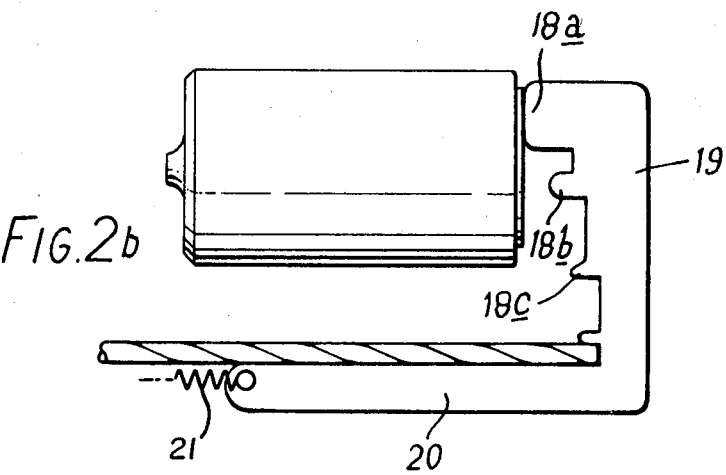
Figure 2C:
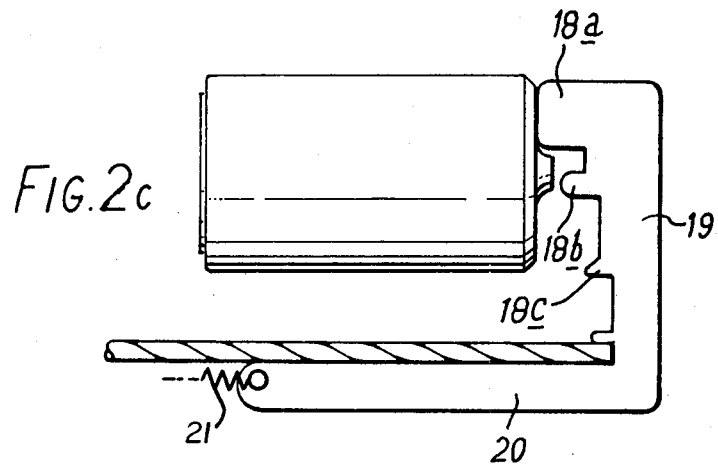

Since there is a risk of explosion if re-charging commences with a dry-cell in an inverted position, i.e. with its central electrode in electrical contact with the plate member 19 and its base in contact with a contact element 17, the plate member 19 is shaped to produce no electrical contact between itself and the central electrodes in these circumstances. Thus each of the contact elements 18a, 18b, 18c is radially offset with respect to the associated central electrode 17a, 17b, 17c to such an extent as to engage only the insulating material surrounding the central electrode as illustrated in FIGS. 2c, 3c and 4c if the dry-cell is placed in an inverted position, while making the required electrical contact as shown in FIGS. 2b, 3b and 4b if the dry-cell is correctly placed. Contact elements 17a, 17b and 17c are disposed in vertical alignment, but contact element 18b is stepped back with respect to contact element 18a, and contact element 18c is stepped back with respect to contact element 18b. This ensures that contact elements 18b and 18c do not come into engagement with the central electrode of dry-cells supported on edges 12 and shoulders 13 respectively, but disposed the wrong way round. At the same time, the arrangement permits a reduction in the overall height of the unit.

Figure 2A:
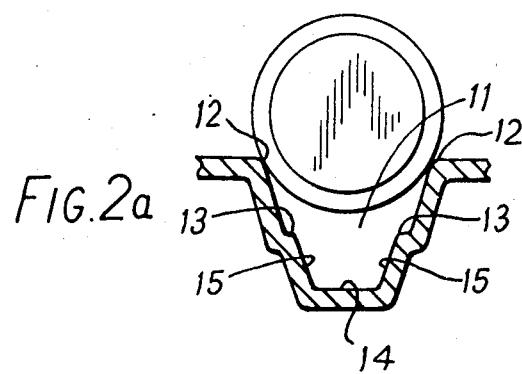
FIG. 2a is a fragmentary cross-section showing a first dry-cell supported on the dry-cell locating means.
Figure 3A:
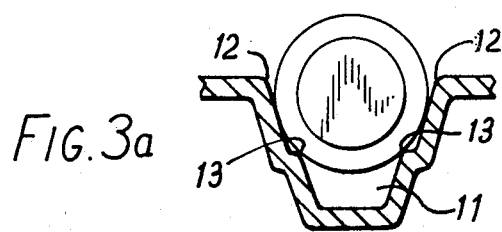
FIG. 3a is a view corresponding to FIG. 2a and showing a smaller diameter dry-cell on the locating means.
Figure 3B:
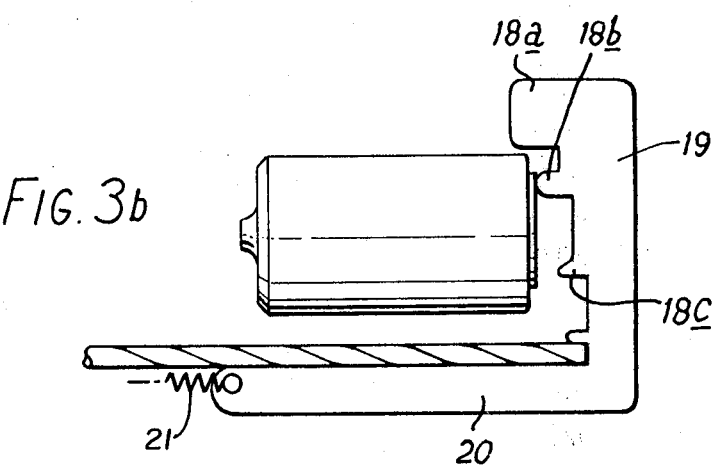
FIGS. 3b and 3c are fragmentary views illustrating the dry-cell of FIG. 3a and correspond to FIGS. 2b and 2c respectively.
Figure 3C:
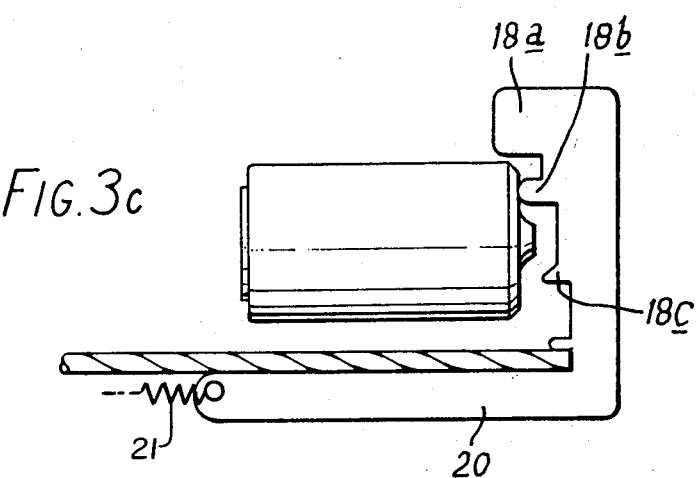
Figure 4A:
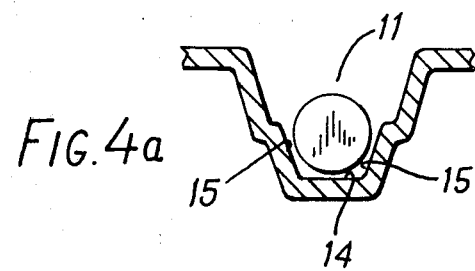
FIG. 4a is a view corresponding to FIG. 2a and showing on the locating means the smallest size of dry-cell which the unit is designed to accommodate.
Figure 4B:
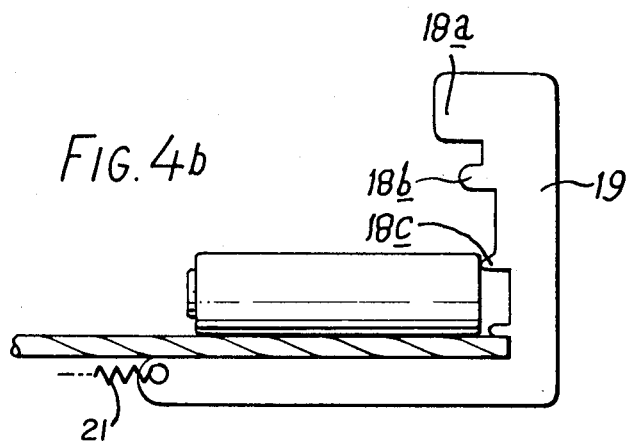
FIGS. 4b and 4c are fragmentary views illustrating the dry-cell of FIG. 4a and correspond to FIGS. 2b and 2c respectively.
Figure 4C:
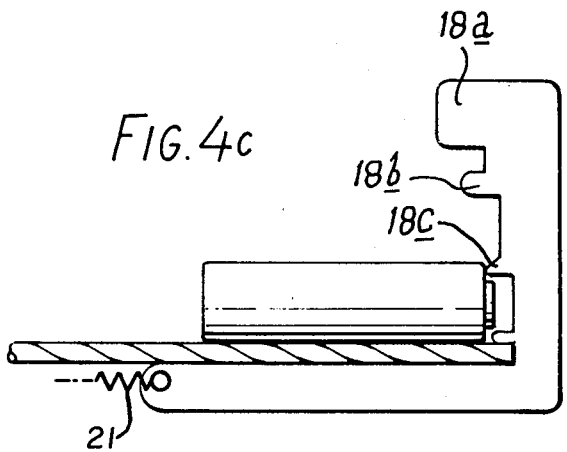

FIGS. 2a, 3a and 4a respectively show dry-cells of sizes C, D and AA in position. The illustrated apparatus also provides recesses 22 for receiving small rectangular dry-cells for re-charging.

It will be clear that the invention is equally applicable to any apparatus providing a holder and electrical contacts for one or more dry-cells.

I claim:

1. A dry-cell holder comprising means for locating a dry-cell or a line of coaxially disposed dry-cells and at least one first and at least one second contact element for respectively engaging the base and central electrode of the dry-cell or, where there is a plurality of coaxially disposed dry-cells, the base of one end dry-cell and the central electrode of the other end dry-cell, the first contact element being offset radially with respect to the second contact element and the central axis of a dry-cell or line of dry-cells supported in the locating means, whereby the first contact element fails to make contact with the central electrode of an adjoining dry-cell placed the wrong way about in the locating means.

2. A dry-cell holder as claimed in claim 1, wherein the locating means is adapted to locate dry-cells of differing diameters at different levels, and further comprising contact means which has a rigidly interconnected set of first contact elements for respectively engaging the bases of dry-cells at said levels and which further has a rigidly interconnected set of said second contact elements for respectively engaging the central electrodes of dry-cells at said levels, each of said first contact elements being offset outwardly with respect to the associated second contact element whereby the first contact elements fail to make contact with the central electrodes of dry-cells placed the wrong way about in the locating means.

3. A dry-cell holder as claimed in claim 2, wherein the locating means comprises an element having a channel extending between the set of first contact elements and the set of second contact elements, the width of the channel decreasing stepwise from the top thereof to the bottom thereby to provide a channel having sidewalls which are stepped inward towards each other at at least one location in the height of the channel thereby to form at least one pair of shoulders in the sidewalls capable of locating a dry-cell or a line of dry-cells or a predetermined diameter.

4. An electric dry-cell re-charging unit which has a dry-cell holder comprising means for locating a dry-cell or a line of coaxially disposed dry-cells and at least one first and at least one second contact element for respectively engaging the base and central electrode of the dry-cell or, where there is a plurality of coaxially disposed dry-cells, the base of one end dry-cell and the central electrode of the other end dry-cell, the first contact element being offset radially with respect to the second contact element and the central axis of a dry-cell or line of dry-cells supported in the locating means, whereby the first contact element fails to make contact with the central electrode of an adjoining dry-cell placed the wrong way about in the locating means.

5. A dry-cell holder comprising means for locating a dry-cell or a line of coaxially disposed dry-cells and at least one first and at least one second contact element for respectively engaging the base and central electrode of the dry-cell or, where there is a plurality of coaxially disposed dry-cells, the base of one end dry-cell and the central electrode of the other end dry-cell, a rigid metal member having said first contact element at a location offset radially with respect to the second contact element and the central axis of a dry-cell or line of dry-cells supported in the locating means, whereby the first contact element fails to make contact with the central electrode of an adjoining dry-cell placed the wrong way about in the locating means, and spring means connected to at least one of said contact elements and operable to urge the first and second contact elements towards each other.

6. A dry-cell holder as claimed in claim 5 wherein the spring means is connected to said rigid metal member and serves to connect said member electrically in circuit with said second contact element.

7. An electric dry-cell re-charging unit comprising means for locating a dry-cell or a line of coaxially disposed dry-cells and at least one first and at least one second contact element for respectively engaging the base and central electrode of the dry-cell or, where there is a plurality of coaxially disposed dry-cells, the base of one end dry-cell and the central electrode of the other end dry-cell, a rigid metal member having said first contact element at a location offset radially with respect to the second contact element and the central axis of a dry-cell or line of dry-cells supported in the locating means, whereby the first contact element fails to make contact with the central electrode of an adjoining dry-cell placed the wrong way about in the locating means, and spring means connected to at least one of said contact elements and operable to urge the first and second contact elements towards each other.

8. An electric dry-cell re-charging unit as claimed in claim 7 wherein the spring means is connected to said rigid metal member and serves to connect said member electrically in circuit with said second contact element.

* * * * *